July 15, 1969     C. N. WINNICK ET AL     3,456,021
HYDROCARBON OXIDATION WITH INERT GAS BLANKETING OF
AQUEOUS BORIC ACID HYDROLYSIS STREAM
Filed Sept. 9, 1965
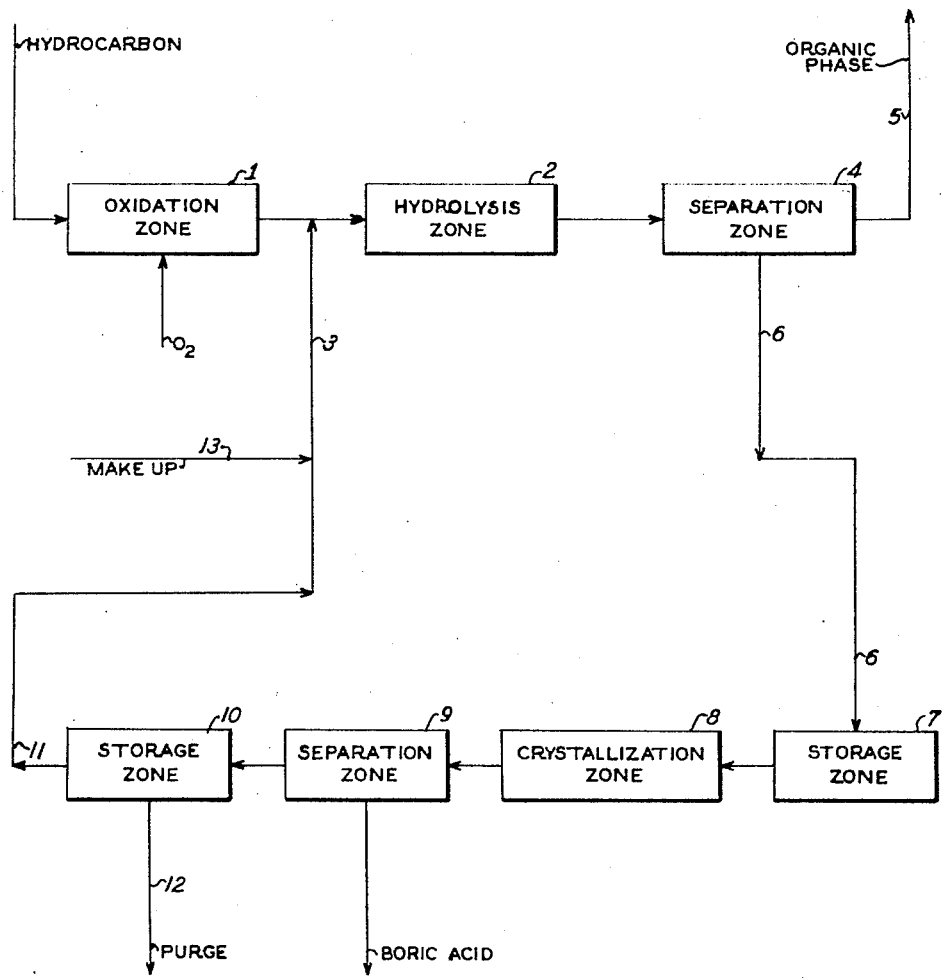
INVENTORS
CHARLES N. WINNICK
IRWIN SCHLOSSMAN
BY William C. Long
ATTORNEY United States Patent Office 3,456,021
Patented July 15, 1969

3,456,021
HYDROCARBON OXIDATION WITH INERT GAS BLANKETING OF AQUEOUS BORIC ACID HYDROLYSIS STREAM
Charles N. Winnick, Teaneck, N.J., and Irwin Schlossman, Whitestone, N.Y., assignors to Halcon International, Inc., a corporation of Delaware
Filed Sept. 9, 1965, Ser. No. 486,100
Int. Cl. C07c *35/08, 29/00, 27/00*
U.S. Cl. 260—631     3 Claims

ABSTRACT OF THE DISCLOSURE

The present invention is concerned with the oxidation of hydrocarbons using boric acid type additives and is particularly concerned with the provision of inert gas blanketing on aqueous boric acid hydrolysis streams in order to suppress resin deposition in the oxidation system.

---

The present invention relates to the oxidation of hydrocarbons and is particularly concerned with improvements in avoiding deposition of resinous material which is formed in certain hydrocarbon oxidations.

Important advances in the partial oxidation of hydrocarbons with molecular oxygen have recently been made. In particular, these advances involve contacting hydrocarbons in the liquid phase with molecular oxygen at oxidizing conditions in the presence of boron compounds such as meta boric acid. Through such procedures the oxidation selectivity to desired oxidation products is very greatly improved. As a result of such oxidations, there is produced a borate ester containing oxidation reaction mixture which is hydrolyzed by contact with an aqueous stream in order to liberate the alcohol product of reaction. The hydrolysis mixture is customarily subjected to a phase separation in order to separate an organic oxidation product containing mixture from the aqueous boric acid phase. The organic phase is worked up in accordance with various techniques and the valuable products are recovered. In economic operation the aqueous phase is treated for the recovery of boric acid values which can be reused in a subsequent practice of the process.

In such techniques, it has now been found that under continuous prolonged periods of operation certain operating difficulties are encountered. Particularly, it has been found that a build up of resinous high molecular weight insoluble material tends to occur at points in the process wherein organic oxidation products are in contact with aqueous process streams. It has been found that the resin build up results in deposition of resinous material on equipment surfaces with resulting problems of plugging and reduced heat transfer and also contamination of process streams.

It is an object of the present invention to provide an improved method for the oxidation of hydrocarbons wherein the problems of deposition of resinous materials is significantly reduced.

It is a particular object of this invention to provide for the reduction in the problem of resin deposition in a process involving the continuous oxidation of cycloalkanes including cyclohexane and cyclododecane.

Other objects will be apparent in the following description of the invention.

In accordance with the present invention, the problems of resin formation and deposition are alleviated by the provision of inert gas blanketing of aqueous process streams. It has been found that resin formation and deposition is significantly suppressed as a result.

In prior practice the hydrocarbon oxidation reaction mixture was hydrolyzed and then subjected to phase separation with the recovery of an organic phase containing unreacted hydrocarbon and the important products of the oxidation. A lower phase comprising aqueous boric acid was separated and was treated for the recovery of boric acid values. This treatment involved the crystallization at low temperatures of boric acid crystals and the separation of these crystals from the aqueous boric acid mother liquor. The aqueous boric acid mother liquor was then recycled to the hydrolysis zone and used therein as the aqueous hydrolysis stream.

In continuous procedures storage or holding tanks were provided at various intervals in the process. In particular, storage or holding tanks were provided for the aqueous boric acid phase from the hydrolysis phase separation and for the aqueous boric acid mother liquor from the crystallization separation prior to recycle to the hydrolysis. The provision of these storage facilities insured that at all times an adequate supply of the stream was available and also was useful in times of temporary plant imbalance.

The aqueous boric acid streams were storaged in tanks under an air atmosphere since this was cheapest and most convenient and not thought detrimental. However, it was found that upon continuous prolonged operation there tended to be formed insoluble high molecular weight resinous materials which eventually deposited on equipment surfaces resulted in plugging of equipment, in reducing heat transfer, and in process stream contamination. In accordance with this invention, the formation of these resinous materials is substantially overcome by blanketing the mother liquor from the boric acid separation with an inert gas.

The accompanying drawing illustrates in diagrammatic form a practice of the present invention.

Zone 1 on the attached drawing represents an oxidation zone wherein a hydrocarbon is oxidized in the liquid phase with molecular oxygen in the presence of a boron compound such as boron oxide or meta boric acid or the like materials. The oxidation effluent after appropriate conversion (usually about 4 to 25%) is removed and passed to the hydrolysis zone wherein this effluent is contacted with an aqueous hydrolysis stream and the borate esters contained in the oxidation effluent are hydrolyzed to boric acid and the hydrocarbon alcohol. The aqueous hydrolysis stream is shown as being introduced through line 3.

From the hydrolysis zone 2, the hydrolysis effluent passes to separation zone 4 wherein the hydrolysis mixture is separated into an organic phase containing unreacted hydrocarbon and the principal alcohol and ketone products of oxidation and an aqueous phase containing the dissolved boric acid. The organic phase is shown as removed through line 5 and is worked up in accordance with the various treatments to recover unreacted hydrocarbon which is recycled and to recover the products of reaction. For purposes of simplicity, the various treatments of this organic phase are not here shown.

The aqueous phase from zone 4 is removed through line 6 and passed to storage zone 7 and thence to crystallization zone 8 wherein the aqueous stream is cooled and boric acid contained therein is crystallized. Most preferably this crystallization zone is a vacuum type crystallization although any equivalent crystallization means can be appropriately employed. From zone 8 crystal and aqueous boric acid mixture passes to separation zone 9 wherein the boric acid crystals are separated as by filtration or centrifugation. These boric acid crystals are suitably recycled for early use in the oxidation zone 1, preferably after dehydration to a form for optimum utilization in the oxidation zone. The aqueous boric acid mother liquor stream from the separation zone 9 is passed to storage vessel 10 wherein the mother liquor is accumulated before being passed as needed to hydrolysis zone 2.

Essential to practice of the present invention is the inert gas blanketing of the aqueous boric acid mother liquor in storage zones 7 and 10. In practice of the invention, an atmosphere of inert gas such as nitrogen, helium, argon, carbon dioxide, or the like is maintained over the liquid in these storage tanks. It is essential that oxygen be substantially completely excluded from the atmosphere which is in contact with these aqueous boric acid streams. The mother liquor from storage zone 10 is employed as needed as the aqueous hydrolysis stream and is recycled to the hydrolysis zone by means of lines 11 and 3. A purge stream is withdrawn as required through line 12 and make up water is added as required through line 13.

By the above practice of the invention, the problems of resinous material formation and deposition are minimized or completely overcome in the hydrocarbon oxidation process. Although the precise nature of the resin material formation is not understood it has been determined that in the process there are formed materials which accumulate in the aqueous process streams and which over continuous prolonged operation involving exposure to molecular oxygen condense into the undesirable resinous deposits. Through practice of this invention whereby the stored aqueous boric acid streams are blanketed as contrasted with previous practices wherein these streams were stored exposed to the atmosphere the buildup of resin materials is avoided and hence the problems of deposition are substantially overcome.

The present invention is applicable generally to the oxidation of hydrocarbons. Aliphatic as well as cycloaliphatic hydrocarbons have been previously oxidized in the presence of the boron material and the improvement of this invention is applicable in any of the previous hydrocarbon oxidation processes; the invention has particular applicability in the processes for the oxidation of cycloalkanes including cyclohexane, cyclopentane, cycloheptane, cyclooctane, cyclodecane, cyclododecane and the like. The invention is also applicable to saturated or unsaturated aliphatic compounds including normal hexane, normal heptane, normal decane, normal hexadecane, mixtures of predominantly normal hydrocarbon having generally 10 to 30 hydrocarbon atoms and the like. The oxidation conditions usually involve air as the oxidizing agent, suitably diluted with inert gas such as nitrogen to an oxygen concentration as 2 to 15% although molecular oxygen in any concentration or from any suitable source can be employed. Boron compound additives include ortho boric acid (which is dehydrated rapidly to a less hydrated form during the reaction) meta boric acid, tetra boric acid, boron oxide, boric acid esters, and the like materials, usually in amounts of from about 0.1 to 15% by weight of the hydrocarbon boron compound mixture.

Pressures employed in the system are those necessary to maintain the liquid phase, e.g., about atmospheric to 1,000 p.s.i.g. Temperatures preferably in the range of about 140° to 180° C. although broadly in the range of about 100° to 250° C. have been taught.

The following example will serve to illustrate an appropriate practice of the invention.

Example 1

Cyclohexane is oxidized in the presence of meta boric acid to form a mixture from which cyclohexanol and cyclohexanone are recovered in high selectivity. The oxidation is carried out in a continuous manner as exemplified in the attached drawing. An admixture of cyclohexane and about 3% by weight meta boric acid is charged to oxidation zone 1 and oxidized therein by an oxidizing gas comprising air diluted with nitrogen to an oxygen content by volume of about 10%. The oxidation is carried out at a temperature of 165° C. and a pressure of about 140 p.s.i.a. The oxidation is continued until about 9% of the cyclohexane is reacted.

The effluent from oxidation zone 1 is continuously passed to hydrolysis zone 2. The effluent is admixed with an aqueous boric acid hydrolysis stream and hydrolyzed in zone 2. The hydrolysis takes place at about 80° C. and the amount of hydrolysis stream is about twice the stoichiometric amount necessary to react with the borate ester in said effluent to form cyclohexanol and boric acid.

From hydrolysis zone 2 the hydrolysis mixture is passed to separation zone 4 wherein the mixture is allowed to settle to two immiscible phases which are separately removed. The upper organic phase comprises essentially a solution of cyclohexanol and cyclohexanone in unreacted cyclohexane. This organic phase is distilled to separate cyclohexane which is recycled to the oxidation zone and to recover a cyclohexanol and cyclohexanone fraction containing about 78% cyclohexanol and about 7% cyclohexanone.

The aqueous phase from separation zone 4 is passed to storage zone 7 and thence to vacuum crystallization zone 8 wherein the temperature is reduced to about 30° C. by vacuum evaporation. The crystals of boric acid formed in crystallization zone 8 are separated by centrifugation in separation zone 9. These crystals are slurried in cyclohexane and dehydrated to form a slurry of meta boric acid in cyclohexane before being recycled to oxidation zone 1.

The aqueous mother liquor from separation zone 9 is passed to storage zone 10 and thence via lines 11 and 3 to hydrolysis zone 2. A purge stream in amount of about 0.5% of the mother liquor is removed via line 12 and make up water is added via line 13 to compensate for the removed purge stream.

Storage zones 7 and 10 are of conventional construction and are maintained partially filled with liquid aqueous process stream. The zones are sealed from the atmosphere and a blanketing atmosphere of nitrogen is maintained in each zone above the liquid level.

After prolonged continuous operation of the process, there is observed no deposition of solid materials on the various process equipment surfaces.

By way of contrast, where the process is similarly practiced but where the storage zones 7 and 10 are exposed to an air atmosphere, black solids are formed in the aqueous hydrolysis stream which deposit on various equipment surfaces causing operating difficulties and eventual process shut down.

Similar results are obtained in the oxidation of other hydrocarbons and with the use of other inert blanketing gases as named above.

What is claimed is,

1. In a process wherein, cycloalkane having 6 to 12 carbon atoms in the ring is oxidized in a liquid phase with molecular oxygen in the presence of a compound which forms a borate ester with the alcohol product of oxidation, the oxidation mixture is hydrolyzed, the hydrolysis mixture is separated into an organic phase and an aqueous boric acid phase, the aqueous boric acid phase is crystallized, boric acid crystals are separated from aqueous boric acid mother liquor, and the aqueous boric acid mother liquor is recycled to the hydrolysis, the improvement which comprises blanketing the aqueous boric acid phase from the hydrolysis and said aqueous mother liquor with an inert gas.

2. The process of claim 1 wherein said cycloalkane is cyclohexane.

3. The process of claim 1 wherein said inert gas is nitrogen.

References Cited

UNITED STATES PATENTS 3,009,961  11/1961  Knoth _____ 260—606.5
3,287,423  11/1966  Steeman et al. _____ 260—631

FOREIGN PATENTS 3,711,121  8/1962  Japan.

OTHER REFERENCES

Bashkirov et al: World Petroleum Congress, 5th Proceedings, N.Y. vol. 4, pp. 175–83, Stanley (discussion) p. 183.

LEON ZITVER, Primary Examiner

M. W. GLYNN, Assistant Examiner

U.S. Cl. X.R.

260—617, 639